5846X
NO PRINTED SPECIFICATION AVAILABLE
*W. Clegg.*
*Bobbin.*
*Patented Feb. 24, 1830.*
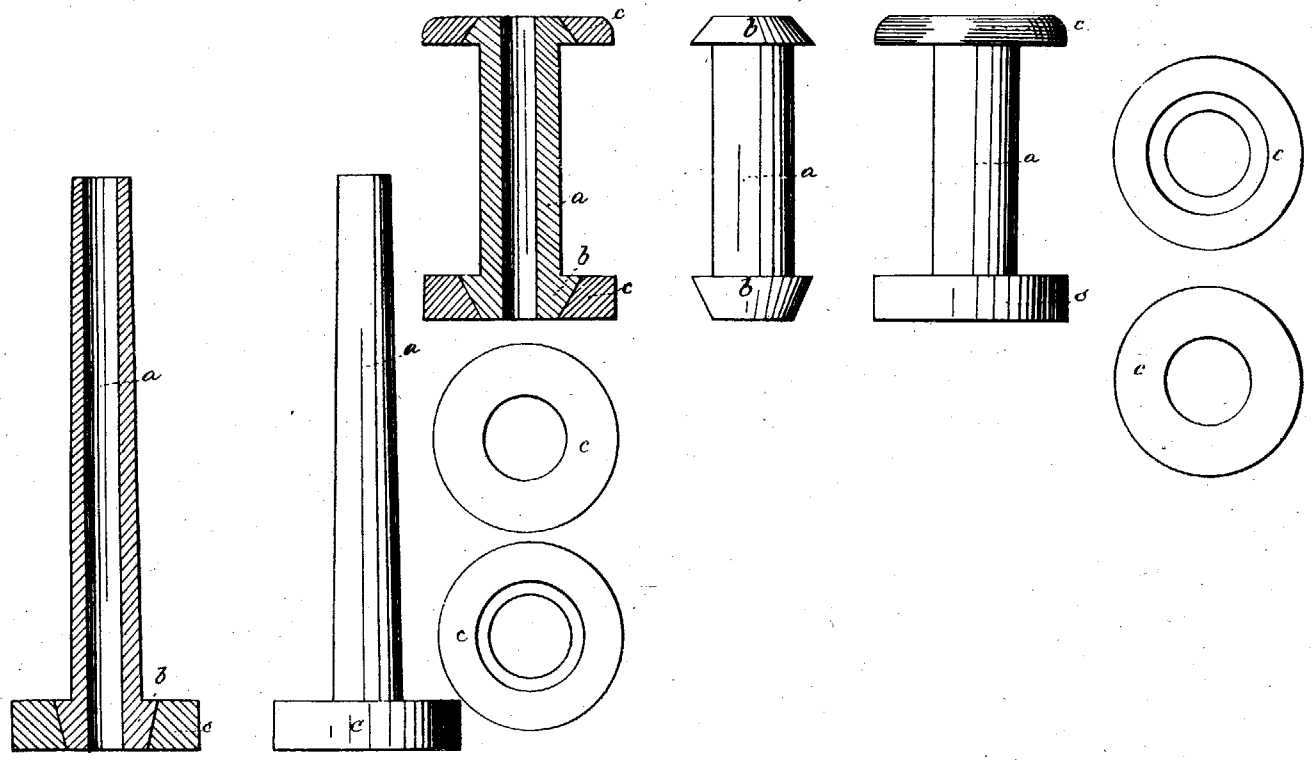

Feb 24. 1830 [illegible]
X5846

William Clegg, of Norwich, State of Connecticut

Letters Patent,

The schedule referred to in these Letters Patent & making part of the same, containing a description in the words of the said William Clegg, himself of his improvement in the mode of manufacturing Spools or bobbins, To all persons to whom these presents shall come William Clegg of Norwich in the County of New London & State of Connecticut, Gentleman sends greeting Be it known that I, William Clegg, have invented constructed, made, and applied to use a new and useful improvement, in the mode of Manufacturing Spools or Bobbins called Clegg's improved collar barrel Spools or Bobbins, Specified in the words following viz —

This improvement in the mode of manufacturing Spools or Bobbins, has the preference over all others heretofore in use because the former mode of making Spools or bobbins used for manufacturing Cotton has been to make the joint that passes thro' the heads the same size or something less than the barrel, the part passing thro' the heads being less than the main shaft or barrel by having a small shoulder formed by lessening the diameter of the ends of the barrel, the consequence of this mode of construction is the bobbins are weak and insecure in this part, the heads continually separating from the barrels & this often when the bobbins are loaded with cotton, which occasions a loss not only of the spool or bobbin but of the yarn which may be on the same, at the time of its failure, The owners of Cotton establishments have also been at great expense in keeping hands to repair such spools or bobbins which [illegible] [illegible] [illegible] a great measure saved when Clegg's

X5846

[illegible]

improved Cotton barrel spools or bobbins shall have come into general use, the great superiority of Clegg's cotton barrel spools or bobbins over all others now in use, consists in having raised collars or joints on the barrel, formed of the same piece of wood & solid with the barrel, the heads being bored in their inner surface so as to receive the collars on the ends of the barrel to a suitable depth the extreme ends of the barrel passing quite thro the heads of a size nearly equal to the diameter of the middle of the barrel the head or heads (as they are made single or double) secured firmly to the barrel's collars with or without Glue, pins, nails, or screws, or with either or any of them the whole constituting a new and valuable improvement in the construction of spools or bobbins used in the manufacture of cotton and other articles & will have a tendency to save a very great part of the expense heretofore incurred by cotton Manufacturers for the article of spools & Bobbins In testimony that the above is a true specification of my said improvement, as above described I have hereunto set my hand and seal the 9th day of January in the year of our Lord 1830.

Witness

Burrel Lathrop

John Hyde

William Clegg